United States Patent [19]

Hendel et al.

[11] 3,825,885

[45] July 23, 1974

[54] MAGNETIC BUBBLE DOMAIN SYSTEM HAVING IMPROVED OPERATING MARGINS

[75] Inventors: Robert J. Hendel, Glenham; Theodore F. Jamba, Jr., Vestal; George E. Keefe, Montrose; Laurence L. Rosier, Amawalk, all of N.Y.

[73] Assignee: International Business Machines Corporation, Armonk, N.Y.

[22] Filed: June 27, 1972

[21] Appl. No.: 266,758

[52] U.S. Cl. ..................... 340/174 TF, 340/174 EB
[51] Int. Cl. ..................... G11c 11/14
[58] Field of Search ..................... 340/174 TF

[56] References Cited

UNITED STATES PATENTS

| | | | |
|---|---|---|---|
| 3,633,185 | 1/1972 | Danylchuk | 340/174 TF |
| 3,699,551 | 10/1972 | Fischer | 340/174 TF |

OTHER PUBLICATIONS

IBM Technical Disclosure Bulletin, Vol. 13, No. 10, March 1971, pg. 2994.

IBM Technical Disclosure Bulletin, Vol. 14, No. 3, Aug. 1971, pgs. 786–789.

*Primary Examiner*—James W. Moffitt
*Attorney, Agent, or Firm*—Jackson E. Stanland

[57] ABSTRACT

A structure for increasing the reliability of a magnetic bubble domain memory system in which the operating margins of various components within the system are enlarged so that the margins of the components will have a larger area of overlap. For components in which a lessening of the effect of the bias field $H_z$ is desirable (splitters, generators, corner propagation elements, etc.), a thin layer of magnetically soft material (for instance, permalloy) is provided which extends over the area of the magnetic sheet in which the component function takes place. This thin layer is in addition to the overlay elements used to provide the function. In a memory system, selectively placed "thin patches" of permalloy or strips of permalloy are used in the critical component areas to improve operating margins of these components.

10 Claims, 6 Drawing Figures

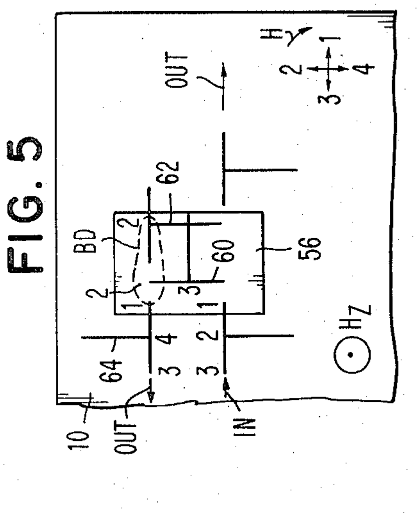
BD
62
60
56
64
OUT
IN
10
Hz
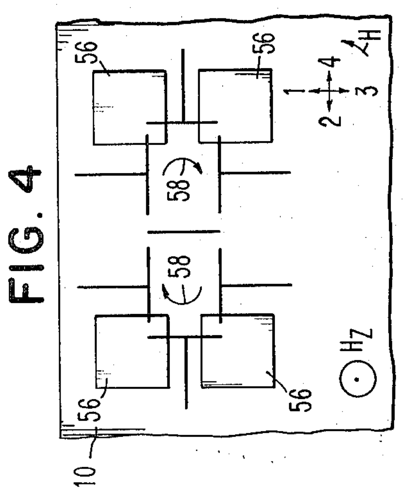
56
58
10
Hz
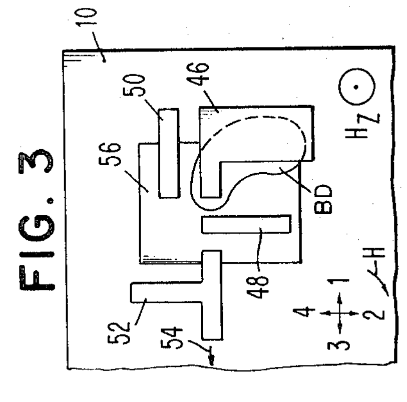
10
50
46
56
BD
48
52
54
Hz
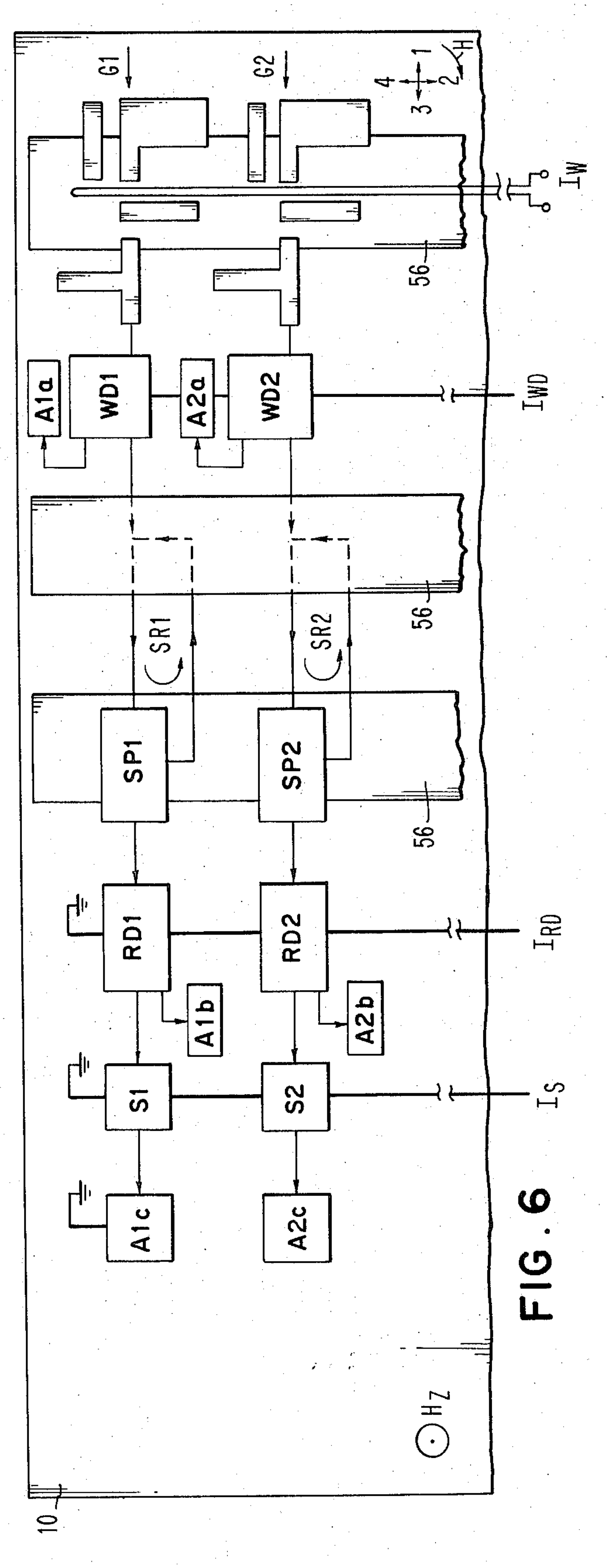
G1
G2
56
IW
A1a
WD1
A2a
WD2
IWD
SR1
SR2
SP1
SP2
RD1
RD2
IRD
A1b
A2b
S1
S2
IS
A1c
A2c
Hz
10

MAGNETIC BUBBLE DOMAIN SYSTEM HAVING IMPROVED OPERATING MARGINS

BACKGROUND OF THE INVENTION

The invention described herein was made in the performance of work under a NASA contract and is subject to the provisions of Section 305 of the National Aeronautics and Space Act of 1958, Public Law 85-568 (72 STAT 435; 42 U.S.C. 2457).

1. Field Of The Invention

This invention relates to magnetic bubble domain memory systems, and more particularly to a system in which increased operating margins are provided by selective use of an additional magnetic layer on the magnetic sheet in which the domains exist.

2. Description Of The Prior Art

Memory systems using magnetic bubble domains as representative of binary information are known in the art. For instance, copending application S.N. 103,046 in the name of H. Chang et al., filed Dec. 31, 1970 and now U.S. Pat. No. 3,701,125 and assigned to the present assignee describes one such memory system. An improved memory system is also described in copending application S.N. 158,232, filed June 30, 1971 and now U.S. Pat. No. 3,689,902 in the name of H. Chang et al., and assigned to the present assignee.

In the memory system described in the aforementioned copending applications, many component functions are required. For instance, domains are generated, propagated in a straight line and around corners, split, annihilated, and made to pass through various switches in order to change their propagation direction. The various components of the memory (generators, annihilators, splitters, etc.,) all have different operating margins, and the common overlap of these margins is often not large. That is, when a plot is made of bias field $H_z$ (normal to the plane of the magnetic sheet in which domains exist) versus the magnitude of the reorienting, in-plane propagation field used to move domains, operating margin plots will be obtained for each of the components in the memory system. Rather than having very similar operating margins, the margins of the different components vary considerably and do not overlap over extended regions of applied propagation field and bias field. Since this is so, very careful design is required to provide a complete magnetic bubble domain memory system.

To overcome the difficult problem of device design where operating margins are extremely critical, it is proposed to use a thin layer of magnetically soft material in the areas where critical component functions are located. This thin layer of magnetically soft material is produced in the form of "patches" localized in the component areas where it is required, or is in the form of thin strips which extend across the magnetic sheet in the areas where similar components are located.

These thin layers of magnetically soft material increase the operating margins of the components in which they are located, and as such are distinguished from the two permalloy sheets which are shown and described in U.S. Pat. No. 3,603,939. In that reference, permalloy sheets are located on both sides and over the entire magnetic sheet in which the domains exist. They function as keeper elements in order to reduce the size of the bubble domains.

In U.S. Pat. No. 3,603,939, the thickness of the permalloy sheet is such that it is magnetically saturated locally in the presence of a domain having prescribed ratios with respect to the permalloy sheet thickness. This is to be contrasted with the present invention, where the layers (patches, strips) of magnetically soft material are only on one side of the bubble domain sheet, do not require saturation to achieve their desirable effect, are localized rather than being in sheets extending across the entire memory plane, and are significantly thinner than the permalloy sheets of the reference. In the present application, saturation is not required in order to achieve a desirable effect on the operating margins of the components in which the layer is located.

In U.S. Pat. No. 3,508,222 a readout technique for magnetic domains is shown in which the domains are expanded and collapsed within conductor loops. In order to keep the domains from being annihilated, a small magnet or an additional circuit is used to counter the "collapse" field within the loop. However, this reference does not teach or suggest the use of a thin layer of magnetically soft material to improve operating margins of various components in a memory system, in order to enhance total reliability of the memory system.

Accordingly, it is a primary object of this invention to provide a magnetic bubble domain memory system having extended operating ranges for the various components within the system.

It is another object of this invention to provide a complete magnetic bubble domain memory system having improved reliability.

It is a further object of this invention to provide a magnetic bubble domain memory system having improved operating margins for all components within the system, in which the bias field has the same magnitude for all components in the system.

It is a still further object ot provide a magnetic bubble domain memory system in which individual component operating margins are increased by means which do not involve additional fabrication steps of additional complexity.

SUMMARY OF THE INVENTION

A magnetic bubble domain system having improved reliability is obtained by using small "patches" of magnetically soft material in the regions where critical components of the system are located. In a preferred embodiment, these patches are comprised of permalloy. These patches are used in addition to the normal overlay elements which provide the component functions.

As an alternative, localized strips of magnetically soft material can be placed on the magnetic sheet in which the domains exist, in those areas where critical components are located. Generally, the thickness of the patches or strips is approximately 200A, although this can be varied. The thickness is such that it does not affect the pole strength of the magnetically soft overlay elements used to provide the component function.

Use of thin layers of permalloy to enhance operating margins of components is advantageous from a fabrication standpoint. Since a thin layer of permalloy (approximately 200A) is first deposited on the magnetic sheet for use in providing magnetoresistive sensing elements, the permalloy to be used for the margin enhancing patches can be readily provided from this initial sheet of permalloy. That is, a permalloy sheet of 200A thickness is first deposited on the magnetic sheet in which the bubble domains exist, or on a thin layer of insulation which has been first provided on the magnetic sheet. After this, the permalloy sheet is masked and areas of it are removed to leave the magnetoresistive sensing elements and also patches or strips to be used to enhance operating margins in the critical component areas. Subsequent deposition of the permalloy overlay elements used for providing the domain functions is then achieved. Consequently, use of a thin layer of permalloy to enhance margins is easily obtained using the same basic fabrication technique used to make the complete bubble domain memory systems described in aforementioned U.S. Pat. Nos. 3,701,125 and 3,689,902.

Another advantage is that operating margins of various components are enhanced without requiring additional electrical interconnections or drive sources. That is, reliability and yield are improved using "on-sheet" techniques, rather than by the use of additional external means, In addition, the density of the domain memory system remains approximately the same and the functions of all components in the memory are not adversely affected.

These and other objects, features, and advantages will be apparent in the following more particular description of the preferred embodiments.

BRIEF DESCRIPTION OF THE DRAWING

FIG. 3 illustrates the use of a thin layer of magnetically soft material to enhance the operating margin of a bubble domain generator.

FIG. 4 illustrates the use of a thin layer of magnetically soft material to enhance propagation of domains around corners.

FIG. 5 illustrates the use of a thin layer of magnetically soft material to enhance the operation of a bubble domain splitter.

FIG. 6 illustrates the use of strips of magnetically soft material across a memory plane to enhance operating margins of components localized in the area of these strips.

DETAILED DESCRIPTION OF THE PREFERRED EMBODIMENTS

Figure 1:
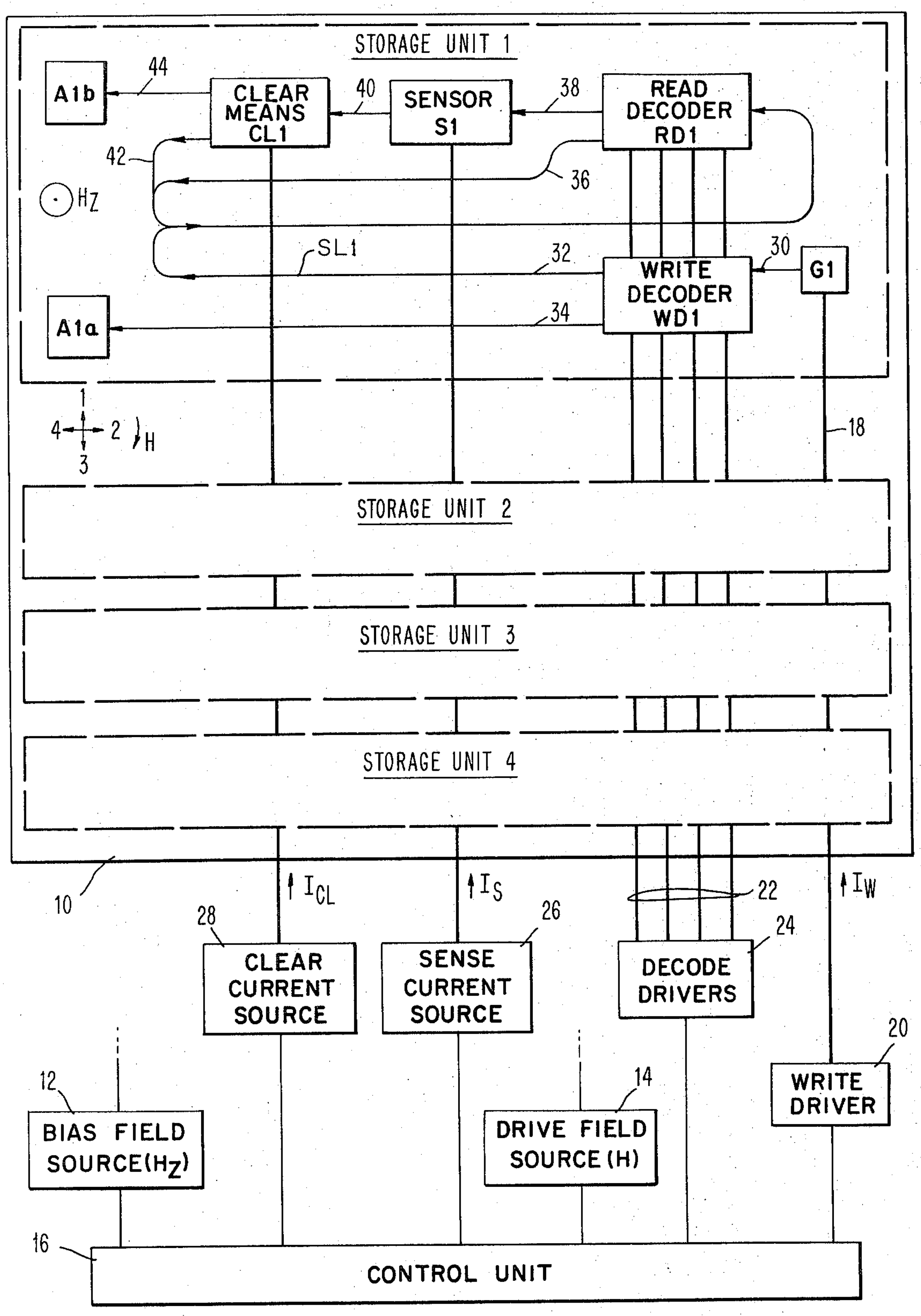
FIG. 1 is a block diagram of a complete memory system.

FIG. 1 is a blosk diagram of a complete memory system using magnetic bubble domains. A system of this type is described in more detail in copending application S.N. 249,026, filed May 1, 1972 and assigned to the present assignee. It is a memory system which is similar in operation to that described in aforementioned U.S. Pat. Nos. 3,701,125 and 3,689,902.

In FIG. 1, magnetic sheet 10, which is a material such as a mixed rare earth garnet, is comprised of various storage units 1–4. Since each of the storage units is the same, only storage unit 1 will be described in more detail. In this figure, and in the other figures, conductor lines are shown as heavy lines while domain propagation paths are indicated by arrows. Storage unit 1 is comprised of domain generator G1, a write decoder WD1, a storage loop S.L1 (such as a shift register), a read decoder RD1, a sensor S1, a clear means CL1, and two annihilators A1a and A1b. Annihilator A1a receives bubble domains from write decoder WD1, while annihilator A1b receives bubble domains from clear means CL1.

Operation of the various components within the shift registers is achieved by the various drivers and current sources shown in the drawing. For instance, bias field source 12 provides the magnetic bias field $H_z$ used to stabilize the size of domains in magnetic sheet 10. Source 12 can be a coil surrounding magnetic sheet 10, a permanent magnet, or a magnetic layer located in contact with magnetic sheet 10 and exchange coupled thereto. All of these means for providing magnetic bias are well known in the art.

Drive field source 14 provides a reorienting, magnetic filed (H) in the plane of magnetic sheet 10. Drive field H is used to propagate domains in each storage unit and to provide the functions of various components in the storage units, such a annihilation, splitting, domain generation, etc. Control unit 16 provides timed pulses to bias field source 12 and to drive field source 14 for controlling the operation of these sources.

Domain generator G1 is a well-known permalloy domain generator having associated therewith a current loop 18 which is used as a binary 1/0 control. That is, depending upon the presence of a current $I_w$ from write driver 20, domains produced by generator G1 are allowed to propagate to srite decoder WD1, or are collapsed.

Write decoder WD1 is provided with current pulses along conductors 22 which are connected to decode drivers 24. Drivers 24 provide current pulses to switches within both write decoder WD1 and read decoder RD1.

Sensor S1 is preferably a magnetoresistive sensor such as is described in copending application S.N. 78,531, filed Oct. 6, 1970 and now U.S. Pat. No. 3,691,540, and assigned to the present assignee. Current $I_s$ through this magnetoresistive sensor is provided by sense current source 26.

A clear means CL1 is provided in storage unit 1 for selectively removing information from storage loop 1 when new information is to be written into this storage loop. Clear means CL1 operates in response to current $I_{CL}$ provided by clear current source 28.

The clear current source 28, sense current source 26, decode drivers 24, and write driver 20 all operate under control of pulses received from control unit 16.

The operation of the memory shown in FIG. 1 will now be briefly described. The description will concern storage unit 1, and it should be understood that the description with respect to this storage unit applies to the other storage units in the memory.

A pattern comprising the presence and absence of magnetic bubble domains is produced by domain generator G1 in response to current $I_w$ produced by write driver 20. These domains are propagated along paths 30 to write decoder WD1. Depending upon the current pulses delivered to decoder WD1 by drivers 24, the domains are either entered into storage loop 1 via path 32, or are sent to annihilator A1a via path 34. Domains in annilhilator A1a are destroyed by the action of rotating drive field H. Of course, drive field H is used to move domains along any of the propagation paths in a manner well known in the art.

Domains in storage loop 1 propagate in this loop to a read decoder RD1. Depending upon the current pulses provided to RD1 by drivers 24, domains in RD1 will either be returned to the storage loop via propagation path 36, or will be sent to sensor S1 via propagation path 38. Domains which are present in sensor S1 are detected, preferably by the magnetoresistive effect. In this type of sensor, current $I_s$ flows through the sensor when domains are present near the sensor. The presence of a domain changes the resistance of the sensing element and this resistance change is detected ultimately as either a current or voltage change. This information is then provided to a utilization circuit (not shown) as is well known.

After passage through sensor S1, domains propagate via path 40 to clear means CL1. Depending upon the presence of current $I_{CL}$ in clear means CL1, the domains will either be returned to storage loop 1 via path 42, or will propagate to annihilator A1b via propagation path 44. This annihilator will destroy the domains in the manner described with respect to annihilator A1a.

Thus, it is apparent that a closed loop storage device is provided in which selective write-in and selective read-out is provided by write decoder WD1 and read decoder RD1, respectively. Further, means is provided to selectively remove information from the storage unit when it is desired to enter new information into this unit. All functions are provided in response to the single reorienting drive field H, and a minimum number of electronic interconnections is required.

In this type of memory, information from generators G1, G2,.... is entered into one storage loop at a time, depending on the input currents to the various decoder circuits WD1, WD2.... Accordingly, read-out of information occurs from one storage loop at a time, in accordance with the inputs applied to the read decoder RD1, RD2,.... .

Many functions are present in a complete memory system as is shown in FIG. 1. For instance, the domain generation function is provided, as well as propagation around corners and in straight lines, annihilation, propagation path switching, etc. It is also possible to use a splitter circuit in this type of memory. Although the various components (generators, splitters, etc.,) can be easily fabricated on magnetic sheet 10, the response of each of these components to various combinations of bias field $H_z$ and drive field H is not the same. Each has different operating margins, and the extent to which the operating margins of the components overlap varies greatly, depending upon component design, properties of magnetic sheet 10, and bubble domain diameter.

Figure 2:
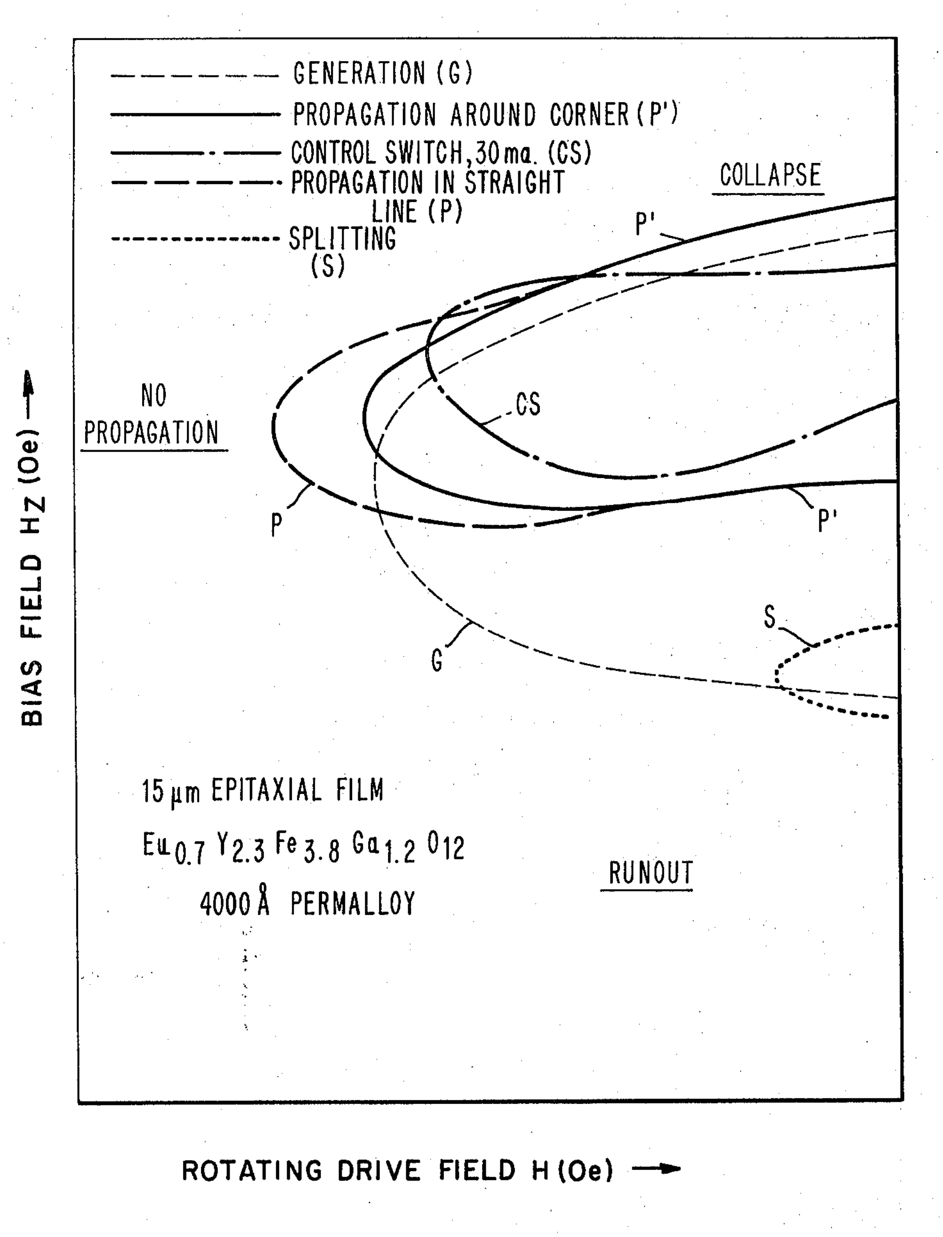
FIG. 2 is a plot of bias field $H_z$ versus drive field H, illustrating the operating margins of various components of a memory system, such as that shown in FIG. 1.

FIG. 2 illustrates the concept of operating margin overlap which is required to provide a usable and reliable bubble domain memory system. In this figure, plots are shown for bias field $H_z$ versus rotating drive field H. In this case, the magnetic sheet 10 is an epitaxial film of $Eu_{0.7}Y_{2.3}Fe_{3.8}Ga_{1.2}O_{12}$, and the components comprise permalloy elements having thickness approximately 4000A. The thickness of the magnetic sheet is 15 $\mu$m.

In FIG. 2, the curve labelled P is for propagation in a straight line, while the curve labelled P' is for propagation around a corner. It will be noted that the operating margin for each of these functions, defined as the area within each curve, is less for propagation around corners than for propagation in a straight line. The curve labelled CS is the operating margin curve for a control switch (a switch used to change the path of a domain, as is done in the decoder circuits). The curve labelled G illustrates the operating margin for domain generators while the curve labelled S illustrates the very small operating margins for domain splitters.

From an inspection of FIG. 2, it is readily apparent that the area of common overlap of all these component functions is not great, and a particular problem arises with the use of domain splitters, whose operating margin is very small and is not desirably located with respect to the other operating margins. The region below the operating margin curves is a region in which domain run-out occurs. That is, the domains cease being cylindrical domains of constant cross-section and "run-out" into strip domains, which generally cause malfunctions in a memory system. In the region to the left of the operating margin curves, domain propagation is not possible. In the region above the operating margin curves, the domains tend to collapse due to the action of the bias field $H_z$.

In general, domains tend to collapse or move away from numerous components within the domain memory system, if precise tolerances are not followed. This creates a difficult problem for the memory designer, and even if the design is very good, the amount of overall operating margin is still very restricted. The present invention serves to alleviate some of the tightness of the operating margins to allow more flexibility in the design of various components in the memory system, and to ultimately provide a more reliable memory system. This is achieved by using a thin layer of magnetically soft material localized in the regions where critical components are located, and is illustrated for three components in FIGS. 3, 4, and 5.

FIG. 3 shows a domain generator comprised of magnetically soft elements located adjacent magnetic sheet 10 which operate on a "mother" bubble BD located on large element 46, when rotating field H is present.

The operation of a domain generator in accordance with FIG. 3 is well known in the art and will not be described in any detail. Generally, domain BD located on element 46 (generally permalloy) travels around the periphery of element 46 in response to the rotation of drive field H. Domain BD is attracted to elements 48 and 50 as field H rotates. As field H continues to rotate, domain BD will be stretched further and will be broken, one part remaining on element 46 while the other part moves to element 52 as field H continues to rotate. The split domain part will follow the propagation path indicated by arrow 54 as field H continues to rotate.

In order to enhance the operating margins of the domain generator of FIG. 3, a thin patch 56 of magnetically soft material is provided on magnetic sheet 10, or on a thin insulating layer located over the entire magnetic sheet 10. Patch 56 has an area encompassing the area where the domain generation function occurs. Its thickness is not critical, and it is generally the thickness of the permalloy layer used for magnetoresistive sensing, which is about 200A. Saturation is not needed for successful operation of thin permalloy layer 56, and the thickness of layer 56 is generally such that the pole strength of elements 46, 48, 50, and 52 of the domain generator are not affected by the presence of layer 56.

Layer 56 decreases the effect of bias field $H_z$ versus drive field H in the region of the domain generator. That is, the domains will not collapse and will not move away from the generator during the domain generation operation.

FIG. 4 shows the use of patchs 56 of magnetically soft material localized in the areas where corner propagation occurs. Since propagation around corners has a critical operating margin, use of patches 56 enhances this margin, and insures that domains do not move away from the propagation elements while moving around the corner. This means that greater operating frequencies for propagation around corners is possible, and the reliability of this function is increased. In FIG. 4, the domains propagate in the direction of arrow 58 in response to rotation of drive field H, in a manner well known in the art.

FIG. 5 shows a bubble domain splitter which has a patch of magnetically soft material 56 located in the area where the splitting function occurs. A splitter of this type is known in the art (H. Chang et al., Presentation at 1971 International Solid State Circuits Conference, Philadelphia, Feb. 18, 1971) and will not be described in detail here. Domains enter the splitter from the left and propagate to crossed T-bars 60 and 62. As drive field H rotates, a domain BD is stretched between pole positions 2 of elements 60 and 62. As field H continues to rotate to direction 1, domain BD is stretched to pole position 1 of element 64. When field H rotates to position 4, domain BD is further stretched to pole position 4 on element 64 and experiences a repelling field at pole position 2 of element 60. The domain then splits and a split domain propagates to the left (output arrow) as drive field H continues to rotate.

In FIG. 5, a thin permalloy layer 56 is localized in the region where the splitting function occurs, in order to increase the operating margin of the splitter. In addition to widening the operating margin of the splitter, the entire curve denoting that margin is shifted upwardly and becomes more attractively located with respect to the curves denoting operating margins of the other components (See FIG. 2).

While patches of permalloy 56 can be placed in localized regions where critical components are located, it is also possible to use strips of permalloy for this function. This is shown in more detail in FIG. 6.

In FIG. 6, magnetic sheet 10 has a plurality of components thereon. For instance in storage unit 1, generator G1 provides an input domain pattern representative of information depending upon the currents $I_W$. These domains propagate by known means to write decoder WD1, after shich they are either sent to annihilator A1a or to a storage loop (shift register SR1), depending on the currents $I_{WD}$ applied to WD1. A splitter SP1 is located in register SR1 for provision of domains to read decoder RD1. Depending on the currents $I_{RD}$, the domains are sent to either annihilator A1b, or to sensor S1. After being sensed, the domains are destroyed by annihilator A1c.

Each storage unit has the same combination of components as is present in storage unit 1. For instance, storage unit 2 has generator G2, write decoder WD2, shift register SR2, splitter SP2, read decoder RD2, sensor S2, etc. Operation of storage unit 2 is the same as that of storage unit 1. Accordingly, it is possible to selectively write information into any shift register and to read information from any shift registers in accordance with the current pulses to the decoders WD1, WD2...., RD1, RD2,.... .

In FIG. 6, strips of thin permalloy 56 are provided across magnetic sheet 10 and are localized in the areas where critical functions exist. For instance, a strip 56 is localized in the area of the splitters SP1, SP2, etc. to enhance the operating margins of the splitters. Another thin permalloy layer 56 is located in the region of the corners of the shift registers SR1, SR2, to increase the operating margin for corner propagation, while yet another permalloy strip 56 is localized in the areas of the generators G1, G2, etc. The various strips operate to enhance operating margins in the same manner as do the isolated patches 56 which are illustrated in FIGS. 3–5.

Method of Fabrication

The magnetic sheet 10 generally has located thereon a thin sheet of insulator, such as $SiO_2$. As an alternative, the insulating sheet need not be used. Deposited on the insulating sheet is a thin sheet of permalloy, generally about 200A. This is used for magnetoresistive sensors S1, S2, etc., That is, the permalloy is selectively etched away except in the areas where the sensors are to be located.

Fabrication of a memory system using permalloy patches or strips to enhance reliability is easily achieved by etching away the thin permalloy sheet except in the areas where sensors are desired, and except in the areas where permalloy patches of strips 56 are desired.

After this, the permalloy overlay elements used for the various components are deposited to a thickness of about 4,000A, as is conventionally done.

Durrent carrying conductors are then deposited directly on the permalloy overlay elements, and if desired, a passivating layer (such as glass) is placed over the entire memory.

If desired, the thin permalloy layer is first deposited, after which the T- and I-bar propagation pattern is deposited through a mask. Conductors are then electroplated through a photoresist mask. The thin permalloy layer is then etched away, except in the regions of the sensors and where permalloy patches (layers) are desired.

Thus, it is apparent that the permalloy patches or strips 56 can be easily provided in a fabrication process which does not involve additional steps or difficulty.

What has been shown is a simple means for enhancing reliability in a magnetic bubble domain memory system. This means comprises layers of thin, magnetically soft material in the areas of the components where margins are critical. This allows the domains to expand and to stay on the various components rather than moving away from the components or being collapsed. This invention has utility even where very elegant component designs are used, since it enables greater ranges of bias field and drive field to be used. The thin layers of magnetically soft material are not used as keeper elements, but instead directly interact in the component functions to enhance these functions. Various thicknesses can be used and it is not important that the thin layers be saturated during operation.

What is claimed is:

1. A magnetic bubble domain apparatus, comprising:

a magnetic medium in which said bubble domains can exist, generator means located adjacent to said magnetic medium for generating magnetic bubble domains therein, a layer of magnetically soft material adjacent to said magnetic medium and localized in the region of said generating means, said layer being non-coplanar with said generator means.

2. The apparatus of claim 1, where said layer is comprised of permalloy.

3. The apparatus of claim 1, where said generating means is comprised of a magnetically soft element.

4. The system of claim 1, where said layer has a thickness approximately 200A.

5. A device, comprising:

a magnetic medium in which magnetic bubble domains can exist, generator means for producing magnetic fields in a direction substantially parallel to the direction of magnetzation of said magnetic medium for generation of bubble domains therein, and a layer of magnetically sofr material deposited on said magnetic medium and localized in the region of said generator means, said layer being non-coplanar with said generator means.

6. The device of claim 5, where said layer is comprised of permalloy.

7. The device of claim 5, further including propagation means for moving said domains in said magnetic medium, there being layers of magnetically soft material deposited on said magnetic medium in selected regions adjacent to said propagation means.

8. An improved device for performing a given function on magnetic bubble domains in a magnetic medium, comprising:

A device which magnetically interacts with said bubble domain to move said bubble domain to a plurality of positions during the time when said device acts on said bubble domain to perform said function, a layer of magnetically soft material which is non-coplanar with said device and which spatially extends in a continuous manner over a plurality of said positions, said layer being sufficiently thin that it does not substantially alter the interaction between said device and said bubble domain being moved by said device.

9.The device of claim 8, where said layer is approxomately 200 Angstroms thick.

10. The deivce of claim 8, where said layer of magnetically soft material is a deposited layer on said magnetic medium.

* * * * *